US010121485B2

(12) United States Patent
Heitkamp et al.

(10) Patent No.: US 10,121,485 B2
(45) Date of Patent: Nov. 6, 2018

(54) SPATIAL AUDIO RESOURCE MANAGEMENT AND MIXING FOR APPLICATIONS

(71) Applicant: Microsoft Technology Licensing, LLC, Redmond, WA (US)

(72) Inventors: Robert Norman Heitkamp, Sammamish, WA (US); Philip Andrew Edry, Seattle, WA (US); Paul J. Radek, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/460,140

(22) Filed: Mar. 15, 2017

(65) Prior Publication Data

US 2017/0287496 A1 Oct. 5, 2017

Related U.S. Application Data

(60) Provisional application No. 62/315,530, filed on Mar. 30, 2016.

(51) Int. Cl.
*G10L 19/20* (2013.01)
*G06F 3/16* (2006.01)
(Continued)

(52) U.S. Cl.
CPC .............. *G10L 19/20* (2013.01); *G06F 3/162* (2013.01); *G10L 19/008* (2013.01);
(Continued)

(58) Field of Classification Search
None
See application file for complete search history.

(56) References Cited

U.S. PATENT DOCUMENTS 6,011,851 A 1/2000 Connor et al.
6,230,130 B1 5/2001 Castello da Costa et al.
(Continued)

FOREIGN PATENT DOCUMENTS

EP 2883366 A1 6/2015
WO 2012125855 A1 9/2012
(Continued)

OTHER PUBLICATIONS

Tsingos, Nicolas, "Perceptually-based auralization", In Proceedings of 19 International Congress on Acoustics, Sep. 2, 2007, pp. 1-7.
(Continued)

*Primary Examiner* — Andrew C Flanders
*Assistant Examiner* — Qin Zhu
(74) *Attorney, Agent, or Firm* — Scott Y. Shigeta; Newport IP, LLC

(57) ABSTRACT

The techniques disclosed herein enable a system to coordinate audio objects that are generated by multiple applications. A system can receive contextual data from several applications and dynamically determine an allocation of a number of audio objects for each application based on the contextual data. The allocation can be based on a status of one or more applications, user interactions with one or more applications, and other factors. Policy data can also cause the system to allocate a number of audio objects to one or more applications based on an application type and other factors. For instance, a policy may cause a system to allocate more audio objects to a game application vs. a communications application. As a user interacts with an application, e.g., moves or resizes a user interface, closes an application, increases or decreases a level of interaction, the system can reallocate audio objects to individual applications.

25 Claims, 9 Drawing Sheets

(51) Int. Cl.
*H04L 29/06* (2006.01)
*H04S 7/00* (2006.01)
*H04S 3/00* (2006.01)
*G10L 19/008* (2013.01)

(52) U.S. Cl.
CPC .......... *H04L 65/1006* (2013.01); *H04S 3/002* (2013.01); *H04S 3/008* (2013.01); *H04S 7/308* (2013.01); *G06F 3/16* (2013.01); *H04S 7/303* (2013.01); *H04S 2400/11* (2013.01)

(56) References Cited

U.S. PATENT DOCUMENTS

| | | | |
|---|---|---|---|
| 7,505,825 B2 | 3/2009 | Wilson et al. | |
| 7,555,354 B2 | 6/2009 | Walsh et al. | |
| 7,987,096 B2 | 7/2011 | Kim et al. | |
| 8,041,057 B2 | 10/2011 | Xiang et al. | |
| 8,078,188 B2 | 12/2011 | Zivney | |
| 8,488,796 B2 | 7/2013 | Jot et al. | |
| 8,498,723 B2 | 7/2013 | Sampat et al. | |
| 8,768,494 B1 | 7/2014 | Stroud et al. | |
| 8,897,466 B2 | 11/2014 | Ho et al. | |
| 9,338,565 B2 | 5/2016 | Hansen | |
| 9,384,742 B2 | 7/2016 | Kim et al. | |
| 2005/0177832 A1* | 8/2005 | Chew | G06F 9/44594 718/104 |
| 2006/0023900 A1 | 2/2006 | Erhart et al. | |
| 2007/0116039 A1 | 5/2007 | Gavagni et al. | |
| 2009/0067636 A1 | 3/2009 | Faure et al. | |
| 2009/0100257 A1 | 4/2009 | Sandmel et al. | |
| 2010/0318913 A1* | 12/2010 | Cupala | G06F 3/0481 715/719 |
| 2010/0322446 A1 | 12/2010 | Strahl | |
| 2011/0002469 A1 | 1/2011 | Ojala | |
| 2012/0224023 A1 | 9/2012 | Zhan et al. | |
| 2013/0202129 A1* | 8/2013 | Kraemer | G10L 19/00 381/77 |
| 2014/0133683 A1* | 5/2014 | Robinson | H04S 3/008 381/303 |
| 2014/0205115 A1 | 7/2014 | Wang et al. | |
| 2015/0146873 A1 | 5/2015 | Chabanne et al. | |
| 2015/0194158 A1* | 7/2015 | Oh | G10L 19/008 381/22 |
| 2015/0279376 A1* | 10/2015 | Beack | G10L 19/008 381/23 |
| 2015/0350804 A1 | 12/2015 | Crockett et al. | |
| 2016/0192105 A1* | 6/2016 | Breebaart | G10L 19/00 381/303 |
| 2017/0048639 A1* | 2/2017 | Melkote | G10L 19/008 |

FOREIGN PATENT DOCUMENTS

| | | |
|---|---|---|
| WO | 2014025752 | 2/2015 |
| WO | 2016018787 A1 | 2/2016 |
| WO | 2016126907 A1 | 8/2016 |

OTHER PUBLICATIONS

Herre, et al., "MPEG-H Audio—The New Standard for Universal Spatial / 3D Audio Coding", In Journal of the Audio Engineering Society, vol. 62, Issue 12, Jan. 5, 2015, pp. 1-12.

Tsingos, Nicolas, "A Versatile Software Architecture for Virtual Audio Simulations", In Proceedings of the International Conference on Auditory Display, Jul. 29, 2001, 6 pages.

Naef, et al., "A VR Interface for Collaborative 3D Audio Performance", In Proceedings of the conference on New Interfaces for musical expression, Jun. 4, 2006, 4 pages.

Dolby, "Dolby AC-4 Audio Delivery for Next-Generation Entertainment Services", Published on: Jun. 2015, Available at: http://www.dolby.com/in/en/technologies/ac-4/Next-Generation-Entertainment-Services.pdf, 30 pages.

Perez-Lopez, Andres, "Real-Time 3D Audio Spatialization Tools for Interactive Performance", In Master Thesis UPF, Retrieved on: Apr. 6, 2016, 67 pages.

Schulz, "DTS Announces DTS: X Object-Based Audio Codec for Mar. 2015 with Support from Onkyo, Denon, Pioneer & More", Published on: Dec. 31, 2014, Available at: http://www.film-tech.com/ubb/f12/t001065.html, 7 pages.

PCT/US2017/024221—International Search Report and Written Opinion, dated Jun. 21, 2017, 14 pages.

ITU-T: "Recommendation ITU-T H.245 Control Protocol for Multimedia Communication", May 1, 2011, 346 pages.

Schmidt Dolby Laboratories F De Beont Phillips Electronics S Doehla Fraunhofer IIS J Kim LG Electronics Inc M: "RTP Payload Format for MPEG-4 AudioNisual Streams; rfc6416.txt", Oct. 18, 2011, 35 pages.

U.S. Appl. No. 15/199,664—Non Final Office Action dated Jun. 16, 2017, 16 pages.

"International Search Report and Written Opinion Issued in PCT Application No. PCT/US2017/025188", dated Jun. 21, 2017, 11 Pages.

International Search Report and Written Opinion Issued in PCT Application No. PCT/US2017/025161, dated Jun. 21, 2017, 10 Pages.

U.S. Appl. No. 15/199,664—Final Office Action dated Jan. 24, 2018, 19 pages.

U.S. Appl. No. 15/460,163—Non Final Office Action dated Jan. 19, 2018, 27 pages.

\* cited by examiner

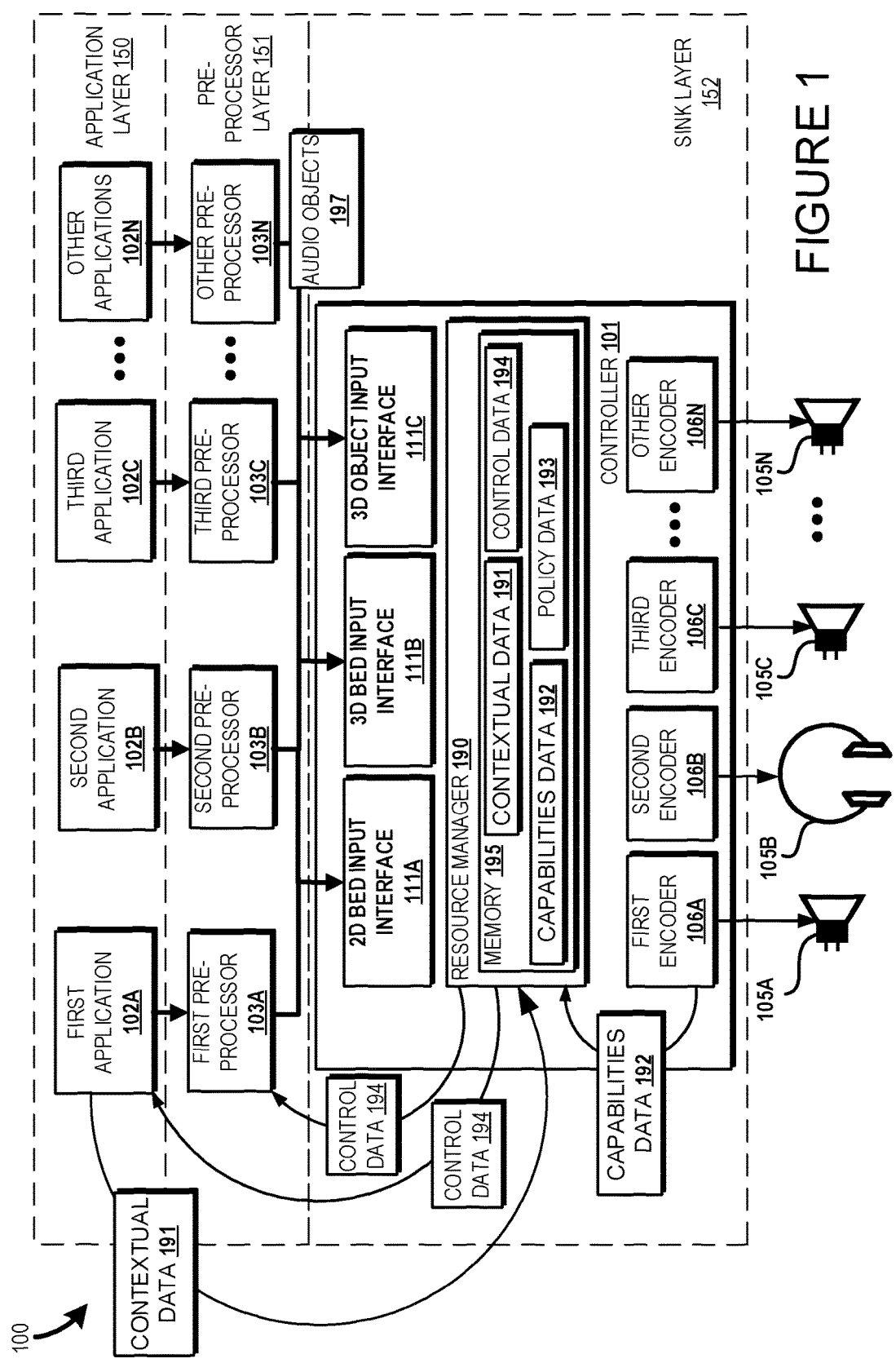

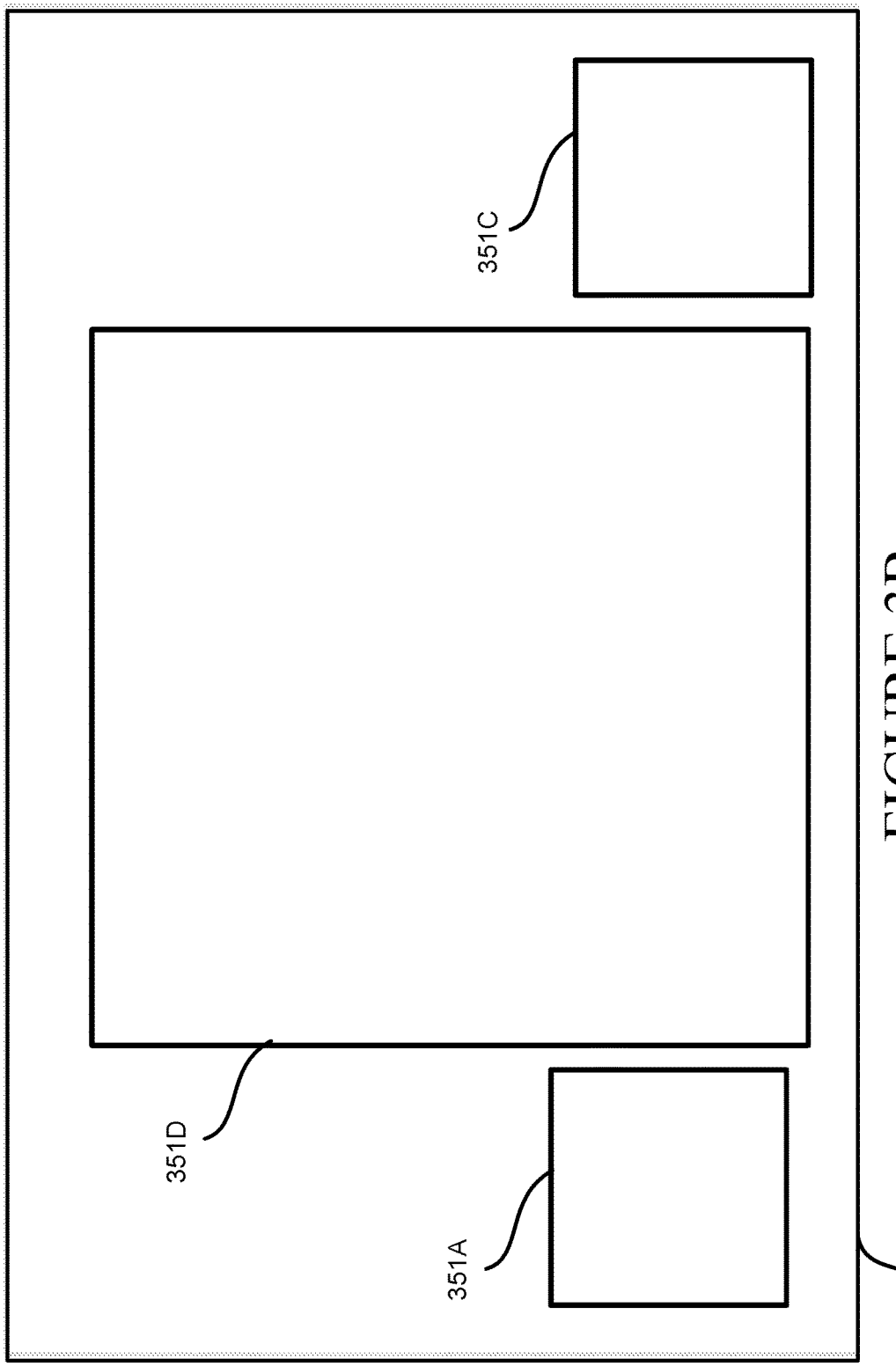

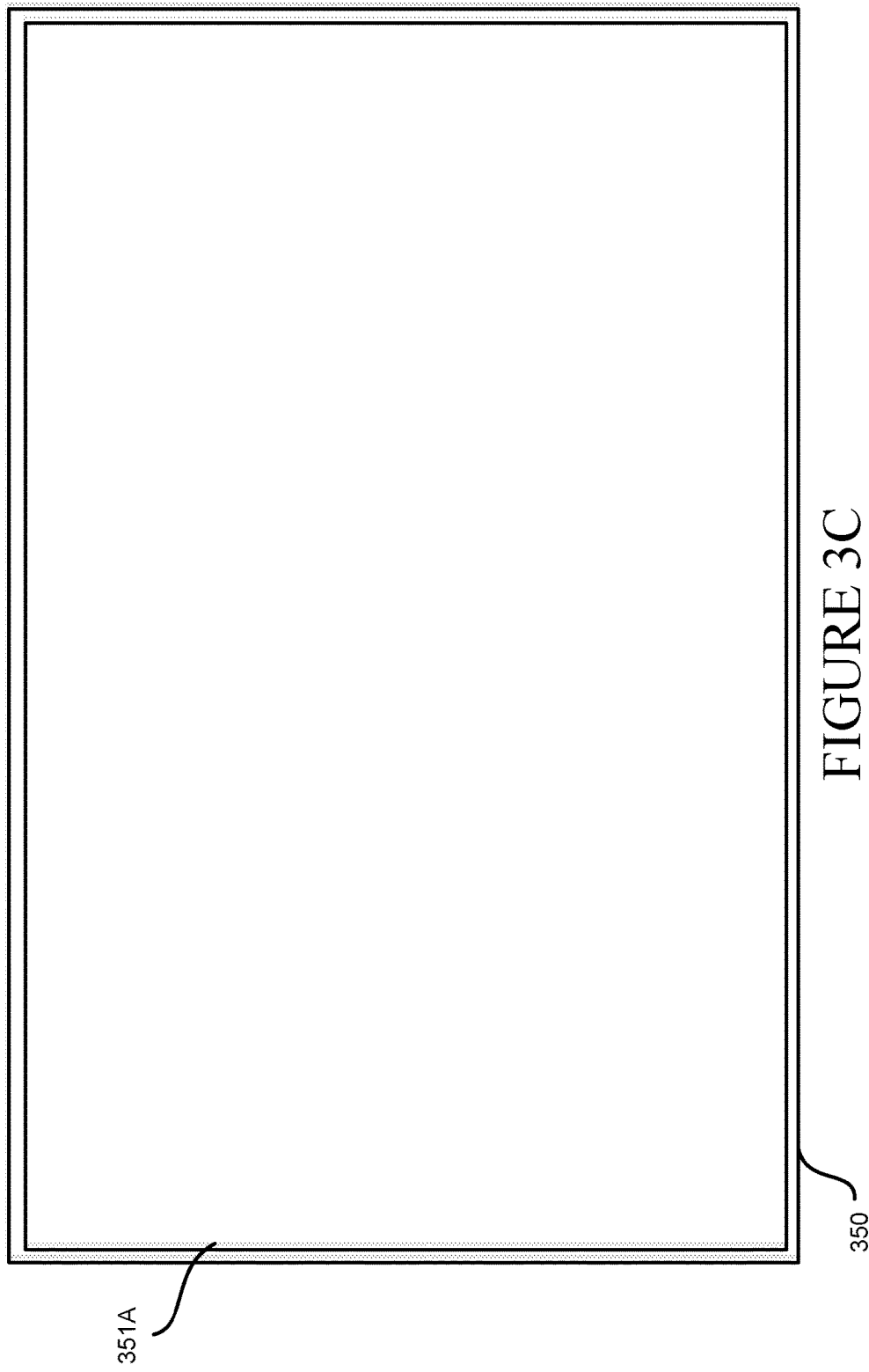

SPATIAL AUDIO RESOURCE MANAGEMENT AND MIXING FOR APPLICATIONS

CROSS REFERENCE TO RELATED APPLICATION

This patent application claims the benefit of U.S. Provisional Patent Application Ser. No. 62/315,530 filed Mar. 30, 2016, entitled "ENHANCED MANAGEMENT OF SPATIALIZATION TECHNOLOGIES," which is hereby incorporated in its entirety by reference.

BACKGROUND

Some software applications can process object-based audio to utilize one or more spatialization technologies. For instance, a video game can utilize a spatialization technology, such as Dolby Atmos, to generate a rich sound that enhances a user's experience. Although some applications can utilize one or more spatialization technologies, some existing systems have a number of drawbacks. For instance, some systems cannot coordinate the use of spatialization technologies when multiple applications are simultaneously processing channel-based audio and object-based audio.

In one example scenario, if a user is running a media player that is utilizing a first spatialization technology and running a video game utilizing another spatialization technology, both applications can take completely different paths on how they render their respective spatially encoded streams. To further this example, if the media player renders audio using HRTF-A and the video game renders audio using HRTF-B, and both output streams are directed to a headset, the user experience may be less than desirable since the applications cannot coordinate the processing of the signal to the headset.

Since applications do not coordinate with one another when processing spatialized audio, some existing systems may not efficiently utilize computing resources. In addition, when multiple applications are running, one application utilizing a particular output device, such as a Dolby Atmos speaker system, can abridge another application's ability to fully utilize the same spatialization technology. Thus, a user may not be able to hear all sounds produced by each application.

It is with respect to these and other considerations that the disclosure made herein is presented.

SUMMARY

The techniques disclosed herein can enable a system to coordinate audio objects that are generated by multiple applications. A system can receive contextual data from several applications and dynamically determine an allocation of a number of audio objects for each application based on the contextual data. The allocation can be based on a status of one or more applications, user interactions with one or more applications, and other factors. Policy data can also cause the system to allocate a number of audio objects to one or more applications based on one or more criteria, which may include an application type, an application status, and other factors. For instance, a policy may cause a system to allocate more audio objects to a game application vs. a communications application. In other examples, a system to allocate more audio objects to an application having a higher level of user engagement, or an application associated with a user interface having a particular size and/or position. Individual applications then generate an audio output based on the allocations associated with each application. A system can also mix, e.g., fold and/or co-locate audio objects from multiple applications. As a user interacts with an application, e.g., moves or resizes a user interface, closes an application, increases or decreases a level of interaction, etc. the system can reallocate audio objects to individual applications.

In some configurations, the techniques disclosed herein enable cross application coordination of audio objects. In one illustrative example, audio objects generated by multiple applications can be folded or co-located to enable a system to reduce or otherwise control the number of audio objects produced by the applications. Thus, one or more co-location techniques, which can involve combining multiple objects from multiple applications into a single object or a reduced number of objects, can be utilized by the embodiments disclosed herein.

In one illustrative example, the system can receive capabilities data indicating capabilities of an encoder and an endpoint device. For example, a Dolby Atmos encoder and a compatible speaker system can provide capabilities data or a signal indicating a predetermined number of audio objects, e.g., 32 audio objects. The system can then determine a threshold number of audio objects that can be processed by the encoder and the endpoint device based on the capabilities data. The system can also receive contextual data associated with individual applications of a computing system. For instance, the contextual data can indicate a type of application, a level of user interaction, a status of an application, a status of a user interface of an application, etc. The system can also receive policy data defining directives for allocating audio objects to individual applications based on the contextual data. The policy data for instance, can cause a system to allocate a number of audio objects to one or more applications based on an application type and other factors.

The system can then generate allocation data indicating a number of allocated audio objects for at least one application of the plurality of applications based, at least in part, on the policy data, the contextual data, and the threshold number of audio objects that can be processed by the encoder and the endpoint device. For instance, if a system has a total of 32 audio objects, a game application may receive an allocation of 28 objects and a spatial chat program may receive an allocation of 4 objects. As will be described in more detail below, such allocations can be based on the status of each application, a policy, and other factors. The system can then transmit control data to the individual applications causing the at least one application to control a number of generated audio objects, wherein the number of generated audio objects is based on the number of allocated audio objects. The applications and/or pre-processors associated with individual applications can then generate a controlled number of audio objects based on the control data. The system can then process the audio objects generated by the applications to generate a spatially encoded stream that appropriately renders the audio of multiple applications to an available output device. As a user interacts with an application, e.g., moves or resizes a user interface, closes an application, increases or decreases a level of interaction, etc. the system can reallocate audio objects to individual applications.

In some configurations, audio objects can be allocated and reallocated when the capabilities of a system change. For instance, when the system downloads a new spatialization technology, thus changing the number of audio objects that can be processed by the system, additional audio objects can be allocated to applications, or an allocation of audio objects to an application can be revoked. In another example, a user may plug in a headphone system that changes the number of audio objects that can be processed by the system. In such scenarios, additional audio objects can be allocated to applications, or an allocation of audio objects to an application can be revoked.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 1 illustrates an example computing device for enabling adaptive audio object allocations.

FIG. 3B furthers the example of FIG. 3A, wherein the audio objects are re-allocated to one or more applications based on a new arrangement of user interfaces.

FIG. 3C also furthers the example of FIG. 3A, wherein the audio objects are re-allocated to one or more applications based on a new arrangement of user interfaces.

DETAILED DESCRIPTION

Figure 2A:
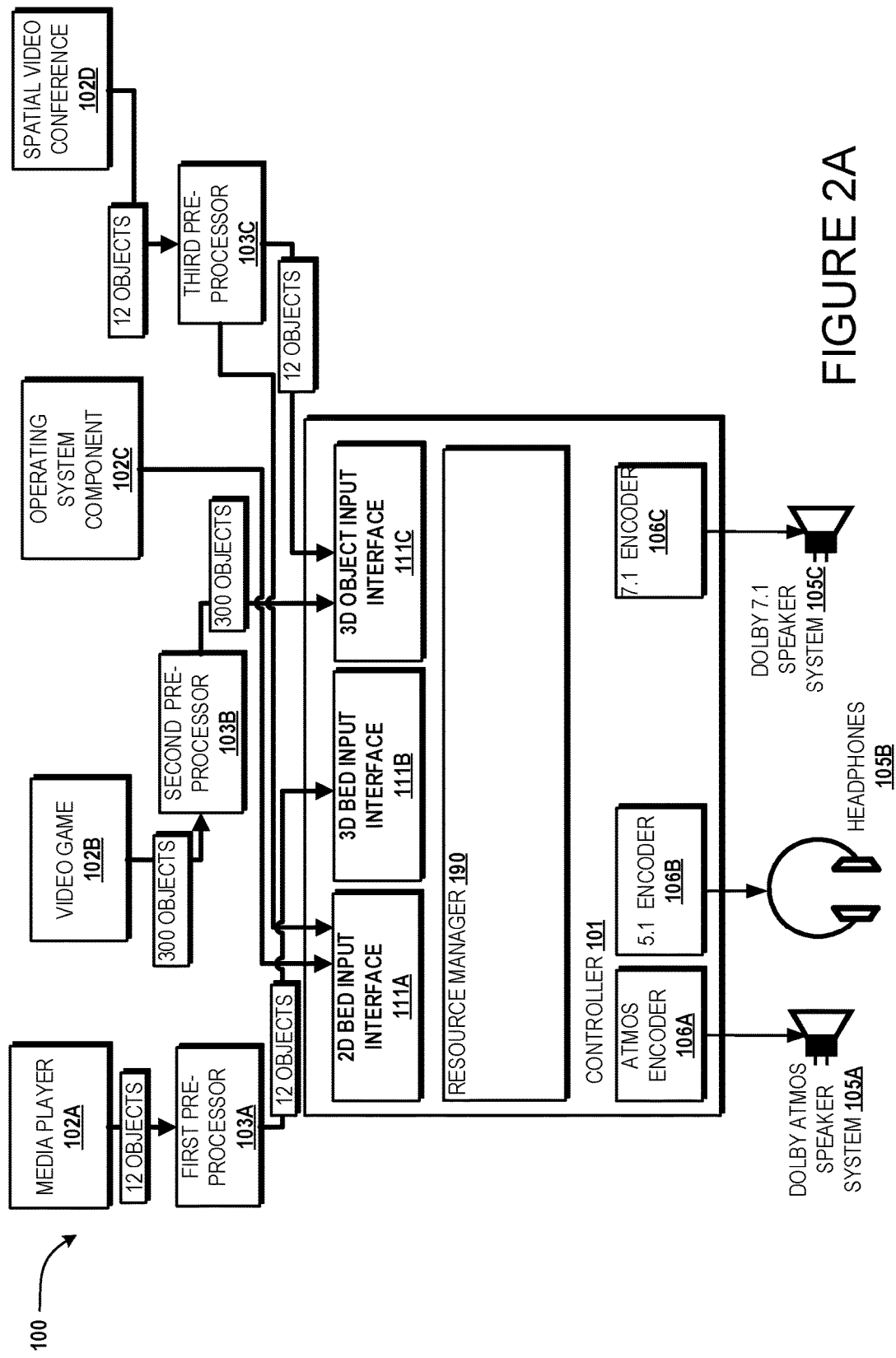
FIG. 2A illustrates an example scenario showing aspects of a system executing a number of applications generating audio objects.

The techniques disclosed herein can enable a system to coordinate audio objects that are generated by multiple applications. A system can receive contextual data from several applications and dynamically determine an allocation of a number of audio objects for each application based on the contextual data. The allocation can be based on a status of one or more applications, user interactions with one or more applications, and other factors. Policy data can also cause the system to allocate a number of audio objects to one or more applications based on an application type and other factors. For instance, a policy may cause a system to allocate more audio objects to a game application vs. a communications application. Individual applications then generate an audio output based on the allocations associated with each application. As a user interacts with an application, e.g., moves or resizes a user interface, closes an application, increases or decreases a level of interaction, etc. the system can reallocate audio objects to individual applications.

In one illustrative example, the system can receive capabilities data indicating capabilities of an encoder and an endpoint device. For example, a Dolby Atmos encoder and a compatible speaker system can provide capabilities data or a signal indicating a predetermined number of audio objects, e.g., 32 audio objects. The system can then determine a number of audio objects that can be processed by the encoder and the endpoint device based on the capabilities. The system can also receive contextual data associated with individual applications of a computing system. For instance, the contextual data can indicate a type of application, a level of user interaction, a status of an application, a status of a user interface of an application, etc. The system can also receive policy data defining directives for allocating audio objects to individual applications based on the contextual data. The policy data for instance, can cause a system to allocate a number of audio objects to one or more applications based on an application type and other factors.

The system can then generate allocation data indicating a number of allocated audio objects for at least one application of the plurality of applications based, at least in part, on the policy data, the contextual data, and the number of audio objects that can be processed by the encoder and the endpoint device. For instance, if a system has a total of 32 audio objects, a game application may receive an allocation of 28 objects and a spatial chat program may receive an allocation of 4 objects. As will be described in more detail below, such allocations can be based on the status of each application, a policy, and other factors. The system can then transmit control data to the individual applications causing the at least one application to control a number of generated audio objects, wherein the number of generated audio objects is based on the number of allocated audio objects. The applications and/or pre-processors associated with individual applications can then generate a controlled number of audio objects based on the control data. The system can then process the audio objects generated by the applications to generate a spatially encoded stream that appropriately renders the audio of multiple applications to an available output device. As a user interacts with an application, e.g., moves or resizes a user interface, closes an application, increases, or decreases a level of interaction, etc. the system can reallocate audio objects to individual applications.

In some configurations, audio objects can be allocated and reallocated when the capabilities of a system change. For instance, when the system downloads a new spatialization technology, thus changing the number of audio objects that can be processed by the system, additional audio objects can be allocated to applications or an allocation of audio objects to an application can be revoked. In another example, a user may plug in a headphone system that changes the number of audio objects that can be processed by the system. In such scenarios, additional audio objects can be allocated to applications or an allocation of audio objects to an application can be revoked.

It should be appreciated that the above-described subject matter may be implemented as a computer-controlled apparatus, a computer process, a computing system, or as an article of manufacture such as a computer-readable storage medium. Among many other benefits, the techniques described herein improve efficiencies with respect to a wide range of computing resources. For instance, human interaction with a device may be improved as the use of the techniques disclosed herein enable a user to hear audio generated audio signals as they are intended. In addition, improved human interaction improves other computing resources such as processor and network resources. Other technical effects other than those mentioned herein can also be realized from implementations of the technologies disclosed herein.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for enabling adaptive audio object allocations will be described. As will be described in more detail below with respect to FIG. 5, there are a number of applications and modules that can embody the functionality and techniques described herein.

FIG. 1 is an illustrative example of a system 100 configured to dynamically select a spatialization technology based on analysis of contextual data. The system 100 comprises a controller 101 for storing, communicating, and processing contextual data 191 stored in a memory 195. The controller 101 also comprises a 2D bed input interface 111A, a 3D bed input interface 111B, and a 3D object input interface 111C respectively configured to receive input signals, e.g., 2D bed audio, 3D bed audio, and 3D object audio, from one or more applications. The controller 101 also comprises a suitable number (N) of encoders 106. For illustrative purposes, some example encoders 106 are individually referred to herein as a first encoder 106A, a second encoder 106B, and a third encoder 106C. The encoders 106 can be associated with a suitable number (N) of output devices 105. For illustrative purposes, some example output devices 105 are individually referred to herein as a first output device 105A, a second output device 105B, a third output device 105C.

The system 100 can also include a suitable number (N) of preprocessors 103. For illustrative purposes, some example preprocessors 103 are individually referred to herein as a first preprocessor 103A, a second preprocessor 103B, and a third preprocessor 103C. The system 100 can also include any suitable number (N) of applications 102. For illustrative purposes, some example applications 102 are individually referred to herein as a first application 102A, a second application 102B, and a third application 102C. The system 100 can also include an application layer 150, a preprocessor layer 151 and a sink layer 152. The example system 100 is provided for illustrative purposes only and is not to be construed as limiting. It can be appreciated that the system 100 can include fewer or more components than those shown in FIG. 1.

For illustrative purposes, 2D bed audio includes channel-based audio, e.g., stereo, Dolby 5.1, etc. 2D bed audio can be generated by software applications and other resources. 3D bed audio includes channel-based audio, where individual channels are associated with objects. For instance, a Dolby 5.1 signal includes multiple channels of audio and each channel can be associated with one or more positions. Metadata, or audio object data defining audio objects, can define one or more positions associated with individual channels of a channel-based audio signal. 3D bed audio can be generated by software applications and other resources. 3D object audio can include any form of object-based audio. In general, object-based audio defines objects that are associated with an audio track. For instance, in a movie, a gunshot can be one object and a person's scream can be another object. Each object can also have an associated position. Metadata, or output data defining audio objects, of the object-based audio enables applications to specify where each sound object originates and how they should move. 3D bed object audio can be generated by software applications and other resources.

The controller 101 comprises a resource manager 190 for analyzing, processing, and communicating contextual data 191, capabilities data 192, and policy data 193. The contextual data 191 can be associated with, and describe aspects of, the individual applications 102. For instance, the contextual data 191 can indicate a type of application, a level of user interaction, a status of an application, a status of a user interface of an application, etc. The capabilities data 192 can define the capabilities of one or more components, including but not limited to an encoder 106, an output device 105, and/or other computing resources. For instance, the capabilities data 192 can indicate a spatialization technology to utilize resources, which can also indicate a number of objects that can be processed by the one or more resources. For example, the capabilities data 192 can indicate that an endpoint device has Dolby Atmos or DTSX capabilities. The capabilities data 192 can also define one or more aspects of a system, including but not limited to processing capabilities and memory capabilities. The policy data 193 can define directives for allocating audio objects to individual applications 102 based on the contextual data 191 and the capabilities data 192. The policy data 193 for instance, can cause a system to allocate a number of audio objects to one or more applications 102 based on an application type, a level of user interactions, an interface status, and other factors. In some configurations, the policy data 193 can also indicate preferences. For example, the policy data 193 can indicate user preferences for a first spatialization technology, e.g., Dolby Atmos, over another spatialization technology, e.g., DTSX, when one or more conditions are present, e.g., when a particular application 102 is in operation, or when a particular application 102 has a particular status. A status can include starting an application, closing an application, entering or exiting a dormant state, etc.

In some configurations, the policy data 193 can define one or more conditions, i.e., any suitable criteria in such conditions can be associated with policy for allocating or revoking audio objects. In addition to allocating or revoking audio objects, the policy data 193 can define one or more conditions or criteria were audio objects generated by the applications are processed as 2D audio or 3D bed audio. Thus, depending on one or more factors, such as an audio type, e.g., music or sound effects, application type e.g., videogame or communication program, select audio streams generated by an application can be processed as 2D audio or 3D bed audio when an allocation of audio objects are revoked. In addition, such streams can be processed as 3D object audio when allocations are made to a particular application generating the streams.

The policy data 192 can also define a minimum number of audio objects and a maximum number of audio objects that can be allocated to an application. For instance, a game application may have a minimum number of audio objects. If the system does not have a number of free audio objects that meets the minimum number of audio objects, a request for the allocation to the game can be held in a queue until the number of free audio objects that meets the minimum number of audio objects. An allocation can also be limited to the maximum number of audio objects for a particular application.

Based on the contextual data 191, capabilities data 192, and policy data 193, the resource manager 190 can generate allocation data indicating a number of allocated audio objects (also referred to herein as control data 194) for at least one application 102 of the plurality of applications. The resource manager 190 can also transmit control data 194 to the individual applications causing the at least one application to control a number of generated audio objects 197, wherein the number of generated audio objects is based on the number of allocated audio objects. As the applications 102 generate audio objects, the audio objects can be communicated to the encoders 106. The encoders 106 can utilize a selected spatialization technology, which can be dynamically selected, to generate a spatially encoded stream that appropriately renders to an available output device. In some examples, the system 100 can cause an encoder 106 to generate a rendered output signal based on the generated audio objects. The system 100 can also cause a communication of the rendered output signal from the encoder to the endpoint device for producing a spatialized audio output based on the endpoint device, wherein the spatialized audio output is an audible output.

The applications 102 can include any executable code configured to process, e.g., generate and/or modify, object-based audio (also referred to herein as "audio objects," "3D bed audio" and "3D object audio") and/or channel-based audio (also referred to herein as "2D bed audio"). Examples of the applications 102 can include but, are not limited to, a media player, a web browser, a video game, a virtual reality application, and a communications application. The applications 102 can also include components of an operating system that generate system sounds.

In some configurations, the applications 102 can apply one or more operations to object-based audio, including, but not limited to, the execution of one or more folding operations. In some configurations, an application 102 can receive control data 194 from the controller 101 to control the number of audio objects of an object-based audio signal that is generated by the application 102. An application 102 can communicate an audio signal to one more preprocessors 103. An application can also communicate an audio signal directly to an input interface 111 of the controller 101.

The preprocessors 103 can be configured to receive an audio signal of one or more applications. The preprocessors 103 can be configured to perform a number of operations to a received audio signal and direct a processed audio signal to an input interface 111 of the controller 101. The operations of a preprocessor 103 can include folding operations that can be applied to object-based audio signals. The preprocessor 103 can also receive control data 194 from the controller 101 to control the number of audio objects of an object-based audio signal that is generated by the applications 102. The preprocessor 103 can also be configured to process other operations, such as distance based attenuation and shape based attenuation. In configurations involving one or more folding operations, a preprocessor 103 can receive contextual data from the controller 101 to control the number of objects of an object-based audio signal that is generated by the preprocessor 103.

The encoders 106 are configured to process channel-based audio and object-based audio according to one or more selected spatialization technologies. A rendered stream generated by an encoder 106 can be communicated to one or more output devices 105. Examples of an output device 105, also referred to herein as an "endpoint device," include, but are not limited to, speaker systems and headphones. An encoder 106 and/or an output device 105 can be configured to utilize one or more spatialization technologies, such as Dolby Atmos, HRTF, Dolby 5.1 and Dolby 7.1, etc.

The encoders 106 can also implement other functionality, such as one or more echo cancellation technologies. Such technologies are beneficial to select and utilize resources outside of the application environment, as individual applications do not have any context of other applications, thus can't determine when echo cancellation and other like technologies should be utilized.

Referring now to FIG. 2A, an example scenario showing the coordination of computing resources between components of the system 100 is shown and described in more detail below. In some configurations, the resource manager 190 can process the contextual data 191, capabilities data 192, and policy data 193 to allocate a number of audio objects to the applications 102.

For illustrative purposes, consider a scenario where the first application 102A is a media player generating object-based audio having 12 objects, the second application 102B is a video game generating object-based audio having 300 objects, the third application 102C is an operating system component generating channel-based audio, and the fourth application 102N is a spatial video conference application generating object-based audio having 12 objects. In this example, it is a given that the first output device 105A and the first encoder 106A utilize the Dolby Atmos technology.

In this configuration, given that the controller 101 receives capabilities data 192 indicating that the Dolby Atmos technology is utilized, it is also a given that the first encoder 106A can only manage 32 objects at one time. Given this scenario, the controller 101 is required to process objects of the object-based audio, e.g., using some fold down operation and/or another operation, in order to enable the first encoder 106A to operate properly.

Based on the number of audio objects that can be processed by the encoder and/or the endpoint device, the controller 101 determines allocations that can made to each application based on the policy data. The policy data 193 may define a number of priorities with respect to each type of application. For instance, priority may be given to communication applications, games, or other applications. In one illustrative example, the policy data 193 can provide a minimum number of objects for certain types of applications. For instance, at least two audio objects can be allocated to a communications application for proper operation.

In such an example, the remaining audio objects that can be processed by the system 100 can be allocated to other applications such as a game.

The controller 101, by the use of control data 194, can then instruct individual applications 102 and/or preprocessors 103 to control the number of objects they each produce. The controller 101 can allocate the total number of audio objects determined from the capabilities data 192 among the applications 102 and/or preprocessors 103 based on a policy and/or other data, including contextual data 191, and user input data. In some configurations, the controller 101 can communicate control data 194 and/or signals to the applications 102 and/or the preprocessors 103 to control the number of objects that are generated by the applications 102 and/or the preprocessors 103.

Figure 2B:
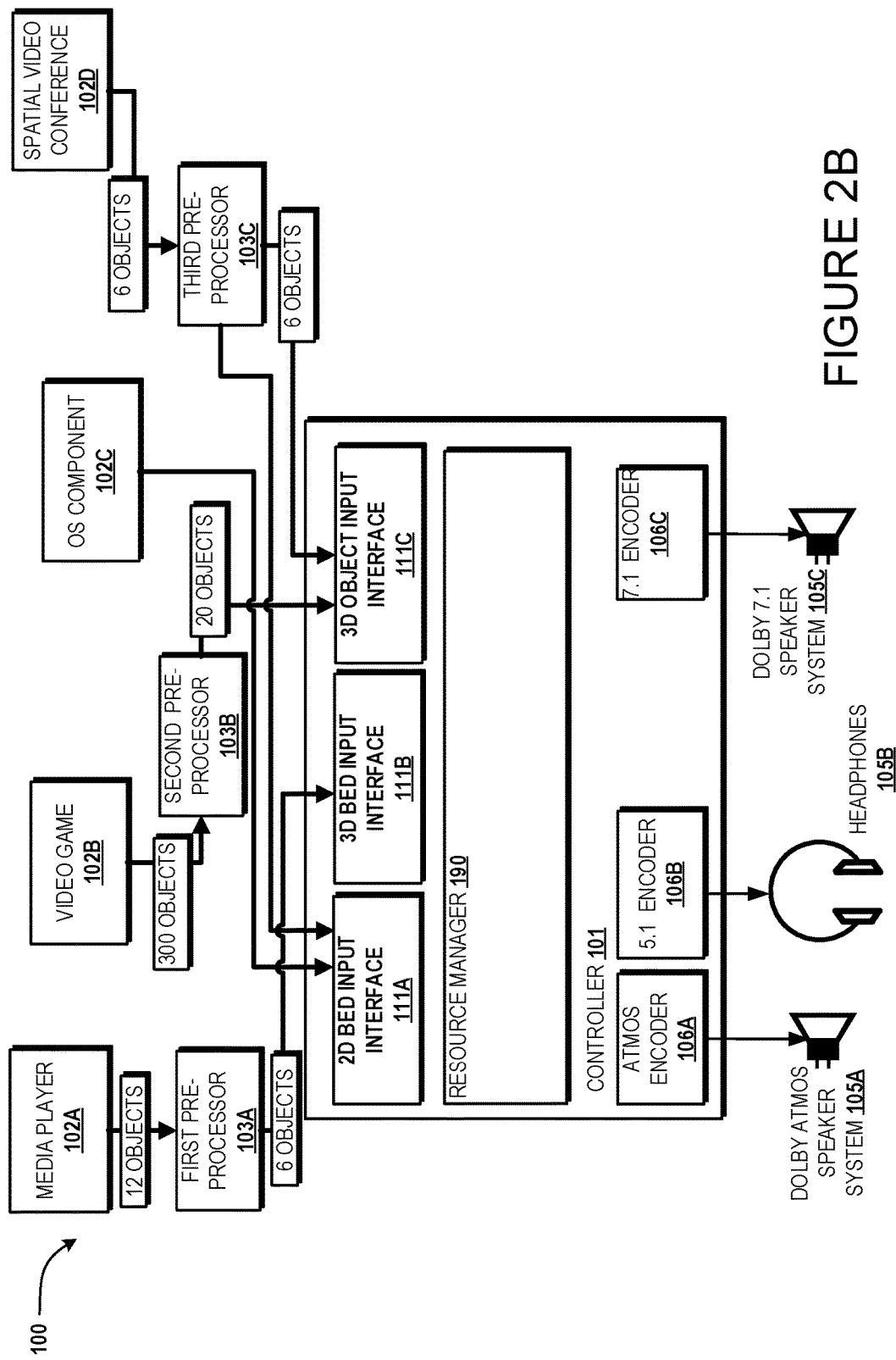
FIG. 2B illustrates a resulting scenario where the system controls the applications of the system and allocates audio objects to the applications causing the applications to control a number of generated objects.

FIG. 2B illustrates one example scenario that may result from the coordination of the controller 101. In this example, based on the contextual data 191, capabilities data 192, and policy data 193 the number of objects can be allocated and communicated to the various sources, e.g., the preprocessors 103 and/or the applications 102.

In some configurations, the controller 101 provides a signal, e.g., control data 194, that enables the preprocessors 103 and/or applications 102 to control the number of audio objects that are generated. Each preprocessor 103 and/or applications 102 can control a number of objects of an associated object-based audio signal using any suitable technique or any suitable combination of techniques. For example, the controller 101 can cause a preprocessor 103 and/or application 102 to utilize one or more co-location techniques, which can involve combining multiple objects into a single object. In another example, the controller 101 can cause a preprocessor 103 and/or application 102 to utilize one or more culling techniques, which can involve the elimination of one or more selected objects. In yet another example, the controller 101 can cause a preprocessor 103 and/or application 102 to utilize one or more fold down techniques, which can involve rendering some objects into a 3D bed signal.

In the example of FIG. 2B, the controller 101 communicates control data 194 defining the allocations to individual preprocessors 103 and/or applications 102. In this example, the first preprocessor 103A is instructed to fold down 12 objects to 6 objects. The second preprocessor 103B is instructed to reduce 300 objects to 20 objects. The spatial video conference application 102D is instructed to reduce its output from 12 objects to 6 objects. At the same time, the third preprocessor 103C is instructed to maintain the output of 6 objects. The object-based audio received at the controller 101 can then be processed by the controller 101 using one or more suitable encoding technologies to generate a rendered output. In some configurations, the controller 101 can mix the channel-based audio with the object-based audio. Thus, the channel-based audio provided by the operating system component 102C, received at the 2D bed input interface 111A, can be mixed with the object-based audio provided by the sources (102A, 102B, and 102D).

The threshold number of objects can be determined based on a number of factors, including, but not limited to, the processing capabilities of the processors or software supporting the controller 101, the capabilities of the preprocessors 103, the capabilities of the applications 102, the capabilities of the encoders 106, the capabilities of the output devices 105, or a combination thereof. Thus, the capabilities data 192 can be received from any one of these resources and other resources. The threshold number of objects can also dynamically change as the contextual data 191, capabilities data 192, and policy data 193 change, or as other aspects of a computing environment change. Thus, in the above-example, if the controller 101 selects another spatialization technology, e.g., one that is not limited to 32 objects, the threshold number of objects can change. For example a change from Dolby Atmos at 32 objects to Microsoft HRTF at 300 objects. These examples are provided for illustrative purposes only and are not to be construed as limiting, as other factors can be used to determine a threshold number of objects.

In another aspect of the techniques disclosed herein, the threshold number of objects can be dynamically allocated to the applications 102 based on one or more factors. Data or a signal defining the allocations can be dynamically communicated to each source to control each source to coordinate the number of objects they each generate.

The allocation of objects to each application 102 and/or preprocessor 103 can be based on a number of factors. For instance, the allocation of objects to an application can be based on the contextual data 191 related to an application 102 and/or the supporting hardware. In other examples, contextual data 191, which may define an interface environment, can be used to determine the number of objects allocated to individual sources, e.g., applications 102 and/or preprocessors 103. For instance, an application that is running in full-screen mode will get a higher allocation of the threshold number of objects vs. an application that's not running in full-screen mode.

In some configurations, the techniques disclosed herein enable cross application coordination of audio objects. In one illustrative example, audio objects generated by multiple applications can be folded or co-located to enable a system to reduce or otherwise control the number of audio objects produced by the applications. One or more co-location techniques, which can involve combining multiple objects from multiple applications into a single object or a reduced number of objects can be utilized by the embodiments disclosed herein. Thus, in addition to, or alternative to, controlling the number of objects generated by an application or a preprocessor, the controller 101 can receive any number of audio objects from a number of applications and control the total number of audio objects by combining, culling, or folding the audio objects received from each application. In some configurations, the total number of audio objects received from the applications can be controlled to a predetermined number of objects, such as the determined threshold.

Figure 3A:
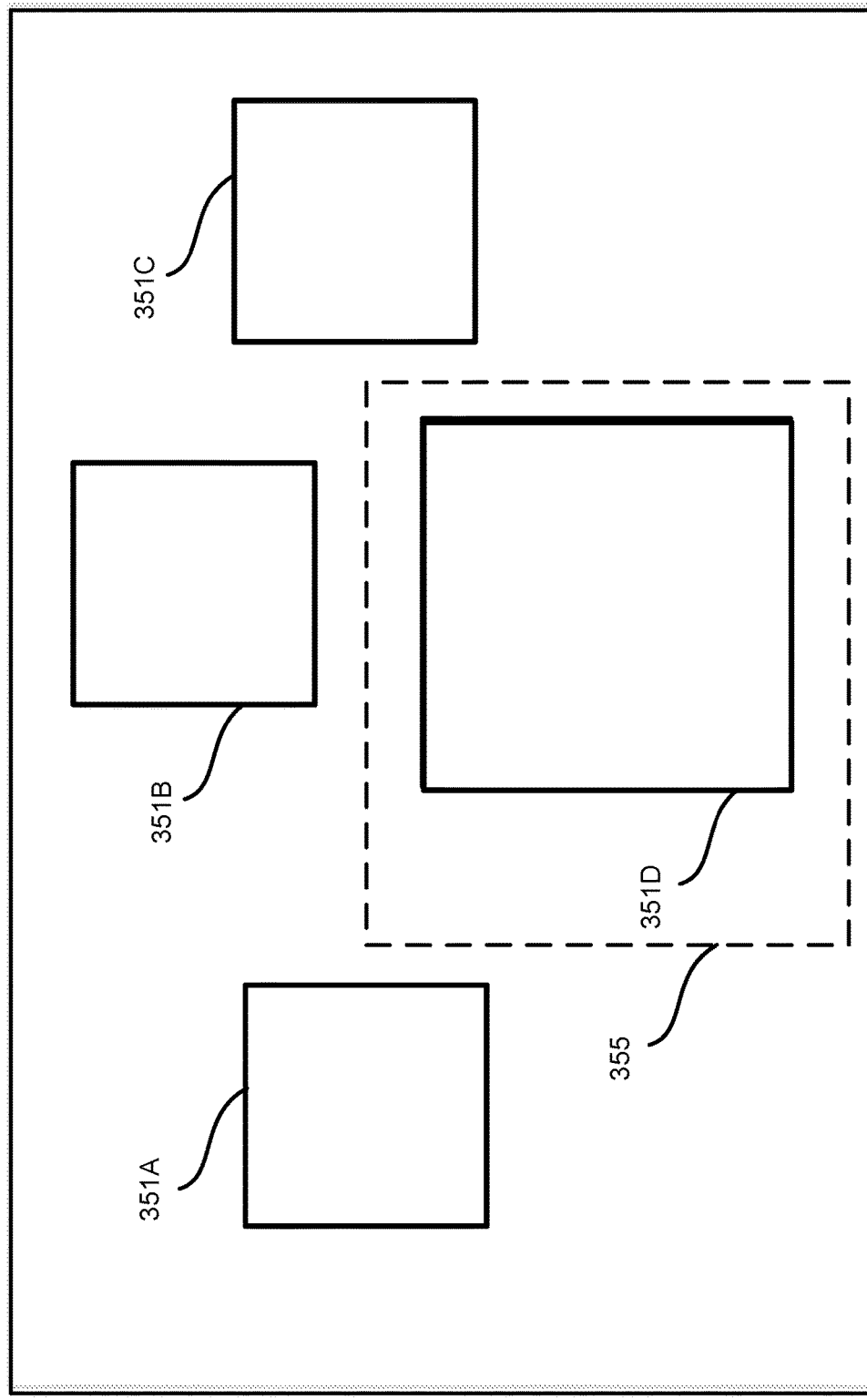
FIG. 3A illustrates a scenario where audio objects are allocated to one or more applications based on an arrangement of user interfaces.

Consider the example illustrated in FIG. 3A, where a display area 350 of a display device comprises a plurality of graphical user interfaces 351. In this example, a first graphical user interface 351A is associated with a first application 102A, a second graphical user interface 351B is associated with a second application 102B, a third graphical user interface 351C is associated with a third application 102C, and a fourth graphic user interface 351D is associated with a fourth application 102D. In this example, each interface 351 can display content generated by a corresponding application 102. In addition, for illustrative purposes, consider a scenario where each application 102 is allocated an equal number of audio objects.

Although this example shows a scenario where each application 102 has an equal number of audio objects, it can be appreciated that the audio objects can be allocated based on a number of factors. For instance, the size and/or position of each graphical user interface can influence allocations made to each application 102. For example, the allocation data can indicate a first number of allocated audio objects for a first application and a second number of allocated objects for a second application, where the first number of allocated audio objects is greater than the second number of allocated objects when a first graphical user interface associated with the first application has a larger display area then a second graphical user interface associated with the second application.

In another example, the allocation data can indicate a first number of allocated audio objects for a first application and a second number of allocated objects for a second application, where the first number of allocated audio objects is greater than the second number of allocated objects when a first graphical user interface associated with the first application is positioned within a predetermined area 355 and a second graphical user interface associated with the second application is positioned outside of the predetermined area 355. A predetermined area 355, for instance, may be an area that is central to a user's viewing area, such as the center of a display area 350. Although this example shows a predetermined area 355 that is near the center of a display area 350, it can be appreciated that a predetermined area 355 can be any other defined portion of a display area 350.

Although these examples influence the allocations based on a graphical user interface, it can be appreciated that the allocations can be based on other factors. For instance, a level of user interaction for an application or status of an application can influence an allocation of audio objects. For instance, if a user has a threshold number of inputs using a device, such as a microphone, keyboard, mouse, or other input device, the allocation may be increased or decreased. With respect to a status of an application, when an application transitions to an active state, a sleep mode or a dormant state, a number of allocated objects for that application may increase or decrease. The policy data can define how a level of interaction or a size and/or position of a graphical user interface can influence the allocation of audio objects to one or more applications.

As summarized above, the dynamic nature of the techniques disclosed herein enable the system 100 to allocate and reallocate audio objects to one or more applications depending on a level of interaction with a user, a status of a graphical user interface 351, or other data. With reference to FIG. 3B, consider a scenario where the user rearranges the graphical user interfaces. In this example, the fourth graphic user interface 351D is increased to a larger size and the second graphical user interface 351B is minimized. In addition, the first graphical user interface 351A and the third graphical user interface 351C are moved to the sides of the display area 350. In such an example, the system 100 can increase the allocation of audio objects to the fourth application 102D since the associated graphical user interface 351D is reconfigured to a larger size. Such a reallocation can also be made if the associated graphical user interface 351D is moved to a center position of the display area 350. In this example, the allocation to the second application 102B may be reduced or revoked since the second graphical user interface 351B is minimized. In this example, the allocations to the first application 102A and the third application 102C may be reduced since the corresponding graphical user interfaces are repositioned to a less prominent location. These examples are provided for illustrative purposes only and are not to be construed as limiting. It can be appreciated that a size and/or location of a graphical user interface 351 can cause a system to allocate or reallocate audio objects to an associated application. For example, as shown in FIG. 3C, the first graphical user interface 351A is reconfigured to a full-screen mode. In such an example, the allocation to the first application may be raised to the threshold number of audio objects and the allocations to the other applications may be revoked. In another example, the allocation to the first application may be increased, while the allocations to the other applications may be reduced.

In a virtual world environment, if a user is looking at a graphical object associated with a particular application and/or preprocessor, those particular sources may receive a higher allocation of the threshold number of objects. These examples are provided for illustrative purposes only and are not to be construed as limiting, as other factors can be used to determine a number of objects that are dynamically allocated to an application 102 and/or a preprocessor 103.

Figure 3D:
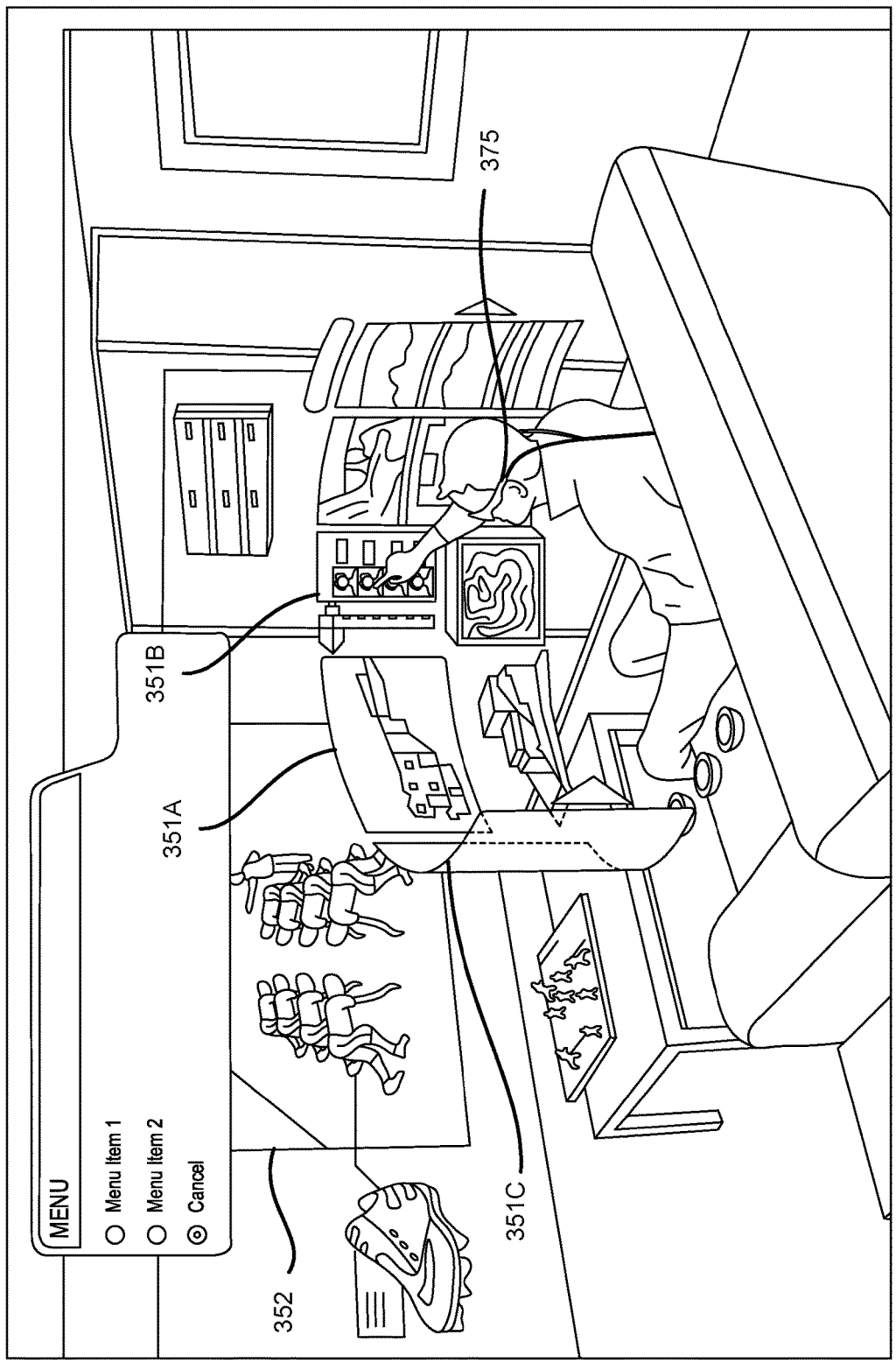
FIG. 3D illustrates a scenario where audio objects are allocated to one or more applications based on a user's interaction with user interfaces of a virtual reality environment.

FIG. 3D illustrates an example virtual world environment having a plurality of graphical user interfaces 351 that are displayed to a user by the use of a headset 375. In this example, the headset 375 is configured with the display area having transparent sections for enabling the user to view real-world display areas such as a television screen 352. The headset 375 is configured with sensors, gyroscopes, and other components for producing data that enables the system 101 to determine which graphical user interface or display area the user is looking at. As the user looks at different graphical user interfaces 351 or display areas (such as the television screen 352), allocations can be increased or decreased depending on the graphic user interface the user is looking at. For instance, if the user is looking at the first graphical user interface 351A, the system 100 may increase the allocation of audio objects to an associated application, such as the first application 102A. In such a scenario, the allocations to the other applications (102B-102D), which are associated with the other interfaces and display areas (351B-351C and 352), may be reduced or completely revoked. Similarly, when the user moves to look at another graphical user interface, such as the second graphical user interface 351B, the allocation for the first application may be reduced and the allocation for the second application may be increased.

The allocations to each application 102 and the preprocessors 103 may be dynamically modified as a user environment and/or capabilities of the supporting modules and/or devices change. In other examples, objects are allocated to an application are based on a window size associated with the application, objects are allocated to an application based on a window position associated with the application, and objects are allocated to an application based on a state of an application, e.g., a paused video temporality allocates objects to other applications. In a virtual reality (VR) environment, if an HMD user is looking at a rendering of a virtual object, the system may allocate a higher number of objects for the object-based audio signal of an application associated with the virtual object. One or more sensors can be used to determine a user's gaze target and/or gaze direction. These examples are provided for illustrative purposes and are not to be construed as limiting. It can be appreciated that the controller 101 can direct applications or preprocessors to generate any suitable number of objects.

Figure 4:
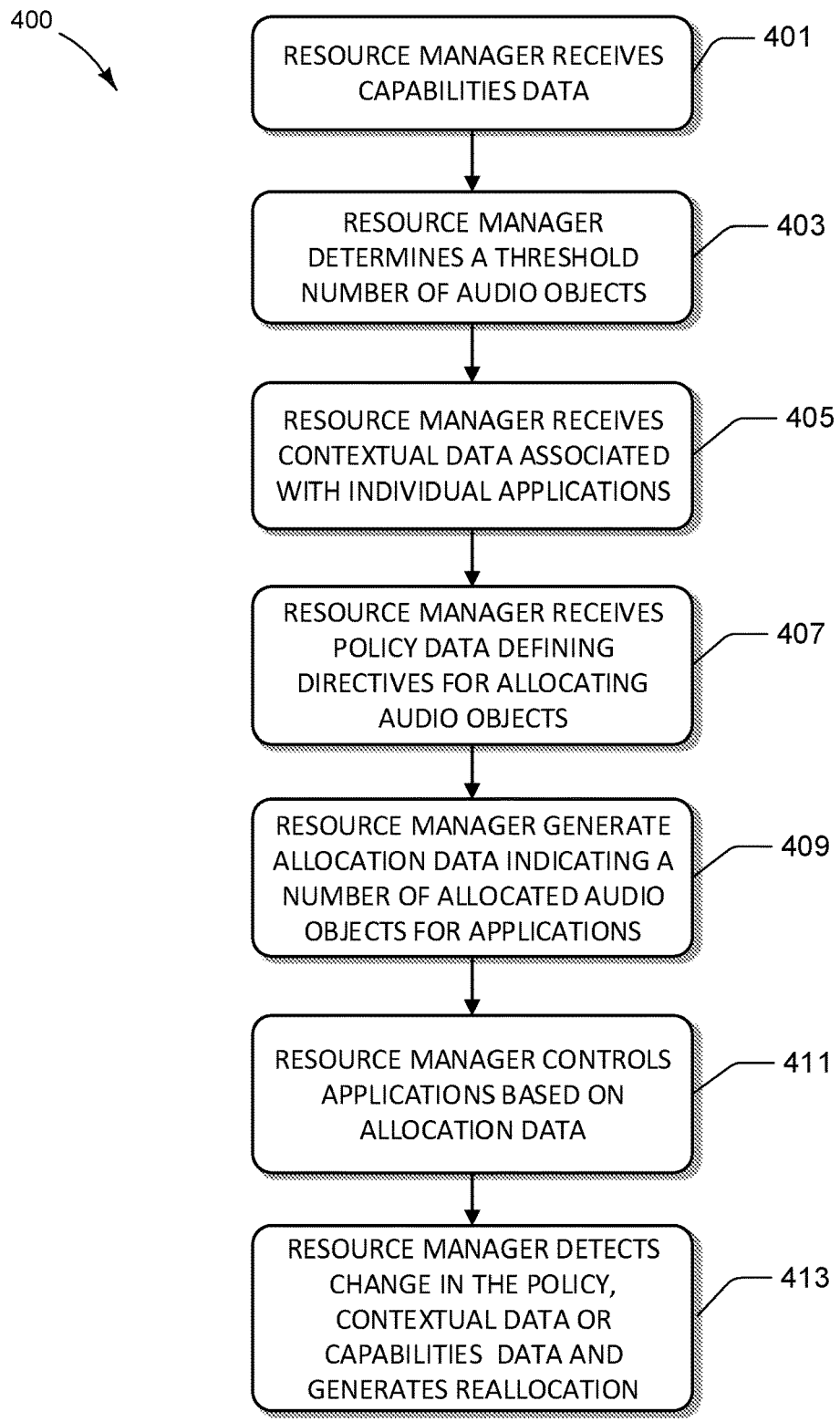
FIG. 4 illustrates aspects of a routine for enabling adaptive audio object allocations.

Turning now to FIG. 4, aspects of a routine 400 for enabling adaptive audio object allocations are shown and described. It should be understood that the operations of the methods disclosed herein are not necessarily presented in any particular order and that performance of some or all of the operations in an alternative order(s) is possible and is contemplated. The operations have been presented in the demonstrated order for ease of description and illustration.

Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 400 are described herein as being implemented, at least in part, by an application, component and/or circuit, such as the resource manager 190. In some configurations, the resource manager 190 can be a dynamically linked library (DLL), a statically linked library, functionality produced by an application programming interface (API), a compiled program, an interpreted program, a script or any other executable set of instructions. Data and/or modules, such as the contextual data 192 and the resource manager 190, can be stored in a data structure in one or more memory components. Data can be retrieved from the data structure by addressing links or references to the data structure.

Figure 5:
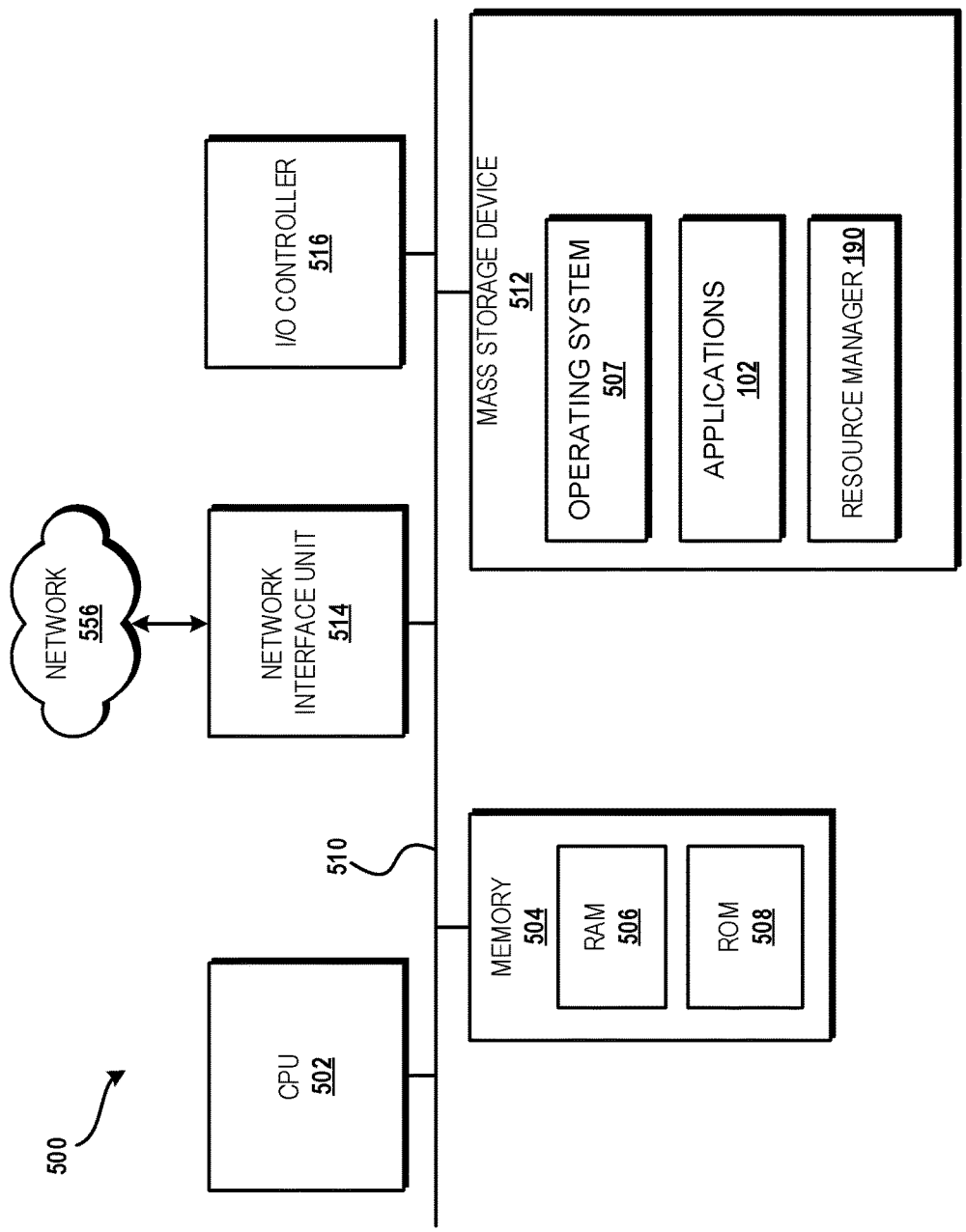
FIG. 5 is a computer architecture diagram illustrating an illustrative computer hardware and software architecture for a computing system capable of implementing aspects of the techniques and technologies presented herein.

Although the following illustration refers to the components of FIG. 1 and FIG. 5, it can be appreciated that the operations of the routine 400 may be also implemented in many other ways. For example, the routine 400 may be implemented, at least in part, by a processor of another remote computer or a local circuit. In addition, one or more of the operations of the routine 400 may alternatively or additionally be implemented, at least in part, by a chipset working alone or in conjunction with other software modules. Any service, circuit or application suitable for providing the techniques disclosed herein can be used in operations described herein.

With reference to FIG. 4, the routine 400 begins at operation 401, where the resource manager 190 receives capabilities data indicating capabilities of an encoder and/or an endpoint device. For example, a Dolby Atmos encoder and a compatible speaker system can provide capabilities data or a signal indicating a predetermined number of audio objects, e.g., 32 audio objects.

Next, at operation 403, the resource manager 190 determines a threshold number of audio objects that can be processed by the encoder and the endpoint device based on the capabilities data. Operation 403 is optional. In some configurations, the threshold number of audio objects of a system can be fixed, or based on data received from another computer, preferences, or other data.

Next, at operation 405, the resource manager 190 receives contextual data associated with individual applications of a computing system. For instance, the contextual data can indicate a type of application, a level of user interaction, a status of an application, a status of a user interface of an application, etc.

Next, at operation 407, the resource manager 190 receives policy data defining directives for allocating audio objects to individual applications based on the contextual data. The policy data for instance, can cause a system to allocate a number of audio objects to one or more applications based on an application type and other factors.

Next, at operation 409, the resource manager 190 generates allocation data indicating a number of allocated audio objects for at least one application of the plurality of applications based, at least in part, on the policy data, the contextual data, and the threshold number of audio objects that can be processed by the encoder and the endpoint device. For instance, if a system has a threshold of 32 audio objects, a game application may receive an allocation of 28 objects and a spatial chat program may receive 4 objects. Such allocations can be based on the status of each application, the policy, and other factors.

Next, at operation 411, the resource manager 190 controls the applications based on the allocation data. In some configurations, the resource manager 190 can transmit control data to the individual applications causing the at least one application to control a number of generated audio objects, wherein the number of generated audio objects is based on the number of allocated audio objects. The applications and/or pre-processors associated with individual applications can then generate a controlled number of audio objects based on the control data. The system can then process the audio objects generated by the applications to generate a spatially encoded stream that appropriately renders the audio of multiple applications to an available output device.

Next, at operation 413, the resource manager 190 detects a change in the policy data, the contextual data, and/or the capabilities data and generates a re-allocation based on the change. For example, as a user interacts with an application, e.g., moves or resizes a user interface, closes an application, increases or decreases a level of interaction, the resource manager 190 can reallocate audio objects to individual applications. The capabilities data can also be updated. For instance, if a user plugs in a new headset, the threshold number of audio objects may increase or decrease based on the capabilities of the new headset. Allocations to the applications can be adjusted based on the new threshold number of audio objects. In addition, a spatialization technology may change. In such an event, allocations to the applications can be adjusted based on the capabilities of the spatialization technology.

FIG. 5 shows additional details of an example computer architecture 500 for a computer, such as the computing device 101 (FIG. 1), capable of executing the program components described herein. Thus, the computer architecture 500 illustrated in FIG. 5 illustrates an architecture for a server computer, mobile phone, a PDA, a smart phone, a desktop computer, a netbook computer, a tablet computer, and/or a laptop computer. The computer architecture 500 may be utilized to execute any aspects of the software components presented herein.

The computer architecture 500 illustrated in FIG. 5 includes a central processing unit 502 ("CPU"), a system memory 504, including a random access memory 506 ("RAM") and a read-only memory ("ROM") 508, and a system bus 510 that couples the memory 504 to the CPU 502. A basic input/output system containing the basic routines that help to transfer information between elements within the computer architecture 500, such as during startup, is stored in the ROM 508. The computer architecture 500 further includes a mass storage device 512 for storing an operating system 507, one or more applications 102, the resource manager 190, and other data and/or modules.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500. For purposes the claims, the phrase "computer storage medium," "computer-readable storage medium" and variations thereof, does not include waves, signals, and/or other transitory and/or intangible communication media, per se.

According to various configurations, the computer architecture 500 may operate in a networked environment using logical connections to remote computers through the network 556 and/or another network (not shown). The computer architecture 500 may connect to the network 556 through a network interface unit 514 connected to the bus 510. It should be appreciated that the network interface unit 514 also may be utilized to connect to other types of networks and remote computer systems. The computer architecture 500 also may include an input/output controller 516 for receiving and processing input from a number of other devices, including a keyboard, mouse, or electronic stylus (not shown in FIG. 5). Similarly, the input/output controller 516 may provide output to a display screen, a printer, or other type of output device (also not shown in FIG. 5).

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

The disclosure presented herein may be considered in view of the following examples.

Example 1

A computing device, comprising: a processor; a computer-readable storage medium in communication with the processor, the computer-readable storage medium having computer-executable instructions stored thereupon which, when executed by the processor, cause the processor to: receive capabilities data indicating capabilities of an encoder and an endpoint device; determine a threshold number of audio objects that can be processed by the encoder and the endpoint device, wherein the threshold number of audio objects is based, at least in part, on the capabilities data indicating the capabilities of the encoder and the endpoint device; receive contextual data associated with individual applications of a plurality of applications; receive policy data defining directives for allocating audio objects to the individual applications based on the contextual data; generate allocation data indicating a number of allocated audio objects for at least one application of the plurality of applications based, at least in part, on the policy data, the contextual data, and the threshold number of audio objects that can be processed by the encoder and the endpoint device; and transmit the allocation data to the individual applications causing the at least one application to control a number of generated audio objects, wherein the number of generated audio objects is based on the number of allocated audio objects.

Example 2

The computing device of example 1, wherein the computer-executable instructions further cause the processor to: receive updated contextual data indicating a change associated with the individual applications; generate updated allocation data indicating an updated number of allocated audio objects for the at least one application based on the updated contextual data; and transmit updated allocation data to the at least one application for modifying the number of audio objects generated by the at least one application.

Example 3

The computing device of examples 1 through 2, wherein the computer-executable instructions further cause the processor to: receive updated capabilities data indicating a change to the capabilities of the encoder and the endpoint device; generate updated allocation data indicating an updated number of allocated audio objects for the at least one application based on the updated contextual data; and transmit updated allocation data to the at least one application for modifying the number of audio objects generated by the at least one application.

Example 4

The computing device of examples 1 through 3, wherein the at least one application comprises a first application and a second application, wherein the allocation data indicates a first number of allocated audio objects for the first application and a second number of allocated objects for the second application, wherein the first number of allocated audio objects is greater than the second number of allocated objects when the policy data indicates that a priority value associated with the first application is higher than a priority value associated with the second application.

Example 5

The computing device of examples 1 through 4, wherein the contextual data indicates a level of user interaction with the individual applications, wherein generating the allocation data indicating the allocation of audio objects for the at least one application is further based on the level of user interaction with the individual applications.

Example 6

The computing device of examples 1 through 5, wherein the contextual data indicates a priority value that is based on a user interface arrangement, wherein generating the allocation data indicating the allocation of audio objects for the at least one application is further based on the priority value.

Example 7

The computing device of examples 1 through 6, wherein the computer-executable instructions further cause the processor to: cause the encoder to generate a rendered output signal based on the generated audio objects; and cause a communication of the rendered output signal from the encoder to the endpoint device for producing a spatialized audio output based on the endpoint device, wherein the spatialized audio output is an audible output.

Example 8

The computing device of examples 1 through 7, wherein the at least one application comprises a first application and a second application, wherein the allocation data indicates a first number of allocated audio objects for the first application and a second number of allocated objects for the second application, wherein the first number of allocated audio objects is greater than the second number of allocated objects when a first graphical user interface associated with the first application has a larger display area then a second graphical user interface associated with the second application.

Example 9

The computing device of examples 1 through 8, wherein the at least one application comprises a first application and a second application, wherein the allocation data indicates a first number of allocated audio objects for the first application and a second number of allocated objects for the second application, wherein the first number of allocated audio objects is greater than the second number of allocated objects when a first graphical user interface associated with the first application is positioned within a predetermined area and a second graphical user interface associated with the second application is positioned outside of the predetermined area.

Example 10

The computing device of examples 1 through 9, wherein the at least one application comprises a first application and a second application, wherein the allocation data indicates a first number of allocated audio objects for the first application and a second number of allocated objects for the second application, wherein the first number of allocated audio objects is greater than the second number of allocated objects when input data from an input device indicates that a user is viewing a first graphical user interface associated with the first application instead of a second graphical user interface associated with the second application.

Example 11

The computing device of examples 1 through 10, wherein the individual applications include the at least one application.

CONCLUSION

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A computing device, comprising:
a processor;
a computer-readable storage medium in communication with the processor, the computer-readable storage medium having computer-executable instructions stored thereupon which, when executed by the processor, cause the processor to:
receive capabilities data indicating a threshold number of audio objects that can be processed by a speaker configuration of an endpoint device in communication with the computing device;
receive policy data defining priorities for individual applications of a plurality of applications;
generate allocation data indicating a number of allocated audio objects for at least one application of the plurality of applications based, at least in part, on the policy data defining a priority for the at least one application, wherein the number of allocated audio objects for the at least one application does not exceed the threshold number of audio objects that can be processed by the speaker configuration of the endpoint device; and
transmit the allocation data to the at least one application causing the at least one application to control a number of generated audio objects, wherein the number of generated audio objects does not exceed the number of allocated audio objects, wherein the at least one application causes an encoder to render the generated audio objects at the endpoint device.

2. The computing device of claim 1, wherein the computer-executable instructions further cause the processor to:
receive updated contextual data indicating a change associated with the individual applications;
generate updated allocation data indicating an updated number of allocated audio objects for the at least one application based on the updated contextual data; and
transmit updated allocation data to the at least one application for modifying the number of audio objects generated by the at least one application.

3. The computing device of claim 1, wherein the computer-executable instructions further cause the processor to:
receive updated capabilities data indicating a change to the threshold number of audio objects that can be processed by a speaker configuration of an endpoint device in communication with the computing device;
generate updated allocation data indicating an updated number of allocated audio objects for the at least one application based on the threshold number of audio objects; and transmit updated allocation data to the at least one application for modifying the number of audio objects generated by the at least one application.

4. The computing device of claim 1, wherein the at least one application comprises a first application and a second application, wherein the allocation data indicates a first number of allocated audio objects for the first application and a second number of allocated objects for the second application, wherein the first number of allocated audio objects is greater than the second number of allocated objects when the policy data indicates that a priority value associated with the first application is higher than a priority value associated with the second application.

5. The computing device of claim 1, wherein the computer-executable instructions further cause the processor to receive contextual data associated with individual applications of a plurality of applications, wherein the contextual data indicates a level of user interaction with the individual applications, wherein generating the allocation data indicating the allocation of audio objects for the at least one application is further based on the level of user interaction with the individual applications.

6. The computing device of claim 1, wherein the computer-executable instructions further cause the processor to receive contextual data associated with individual applications of a plurality of applications, wherein the contextual data indicates a priority value that is based on a user interface arrangement, wherein generating the allocation data indicating the allocation of audio objects for the at least one application is further based on the priority value.

7. The computing device of claim 1, wherein the computer-executable instructions further cause the processor to:
cause the encoder to generate a rendered output signal based on the generated audio objects; and
cause a communication of the rendered output signal from the encoder to the endpoint device for producing a spatialized audio output based on the endpoint device, wherein the spatialized audio output is an audible output.

8. The computing device of claim 1, wherein the at least one application comprises a first application and a second application, wherein the allocation data indicates a first number of allocated audio objects for the first application and a second number of allocated audio objects for the second application, wherein the first number of allocated audio objects is greater than the second number of allocated audio objects when a first graphical user interface associated with the first application has a larger display area than a second graphical user interface associated with the second application.

9. The computing device of claim 1, wherein the at least one application comprises a first application and a second application, wherein the allocation data indicates a first number of allocated audio objects for the first application and a second number of allocated objects for the second application, wherein the first number of allocated audio objects is greater than the second number of allocated objects when a first graphical user interface associated with the first application is positioned within a predetermined area and a second graphical user interface associated with the second application is positioned outside of the predetermined area.

10. The computing device of claim 1, wherein the at least one application comprises a first application and a second application, wherein the allocation data indicates a first number of allocated audio objects for the first application and a second number of allocated objects for the second application, wherein the first number of allocated audio objects is greater than the second number of allocated objects when input data from an input device indicates that a user is viewing a first graphical user interface associated with the first application instead of a second graphical user interface associated with the second application.

11. A computing device, comprising:
a processor;
a computer-readable storage medium in communication with the processor, the computer-readable storage medium having computer-executable instructions stored thereupon which, when executed by the processor, cause the processor to:
receive contextual data indicating a status with individual applications of a plurality of applications;
receive policy data defining priorities for individual applications of a plurality of applications;
generate allocation data indicating a number of allocated audio objects for at least one application of the plurality of applications based, at least in part, on the policy data defining a priority and a status for the at least one application, wherein the number of allocated audio objects for the at least one application does not exceed a threshold number of audio objects that can be processed by a speaker configuration of an endpoint device; and
transmit the allocation data to the at least one application causing the at least one application to control a number of generated audio objects, wherein the number of generated audio objects does not exceed the number of allocated audio objects, wherein the at least one application causes an encoder to render the generated audio objects at the endpoint device.

12. The computing device of claim 11, wherein the computer-executable instructions further cause the processor to:
receive updated contextual data indicating a change associated with the individual applications;
generate updated allocation data indicating an updated number of allocated audio objects for the at least one application based on the updated contextual data; and
transmit updated allocation data to the at least one application for modifying the number of audio objects generated by the at least one application.

13. The computing device of claim 11, wherein the computer-executable instructions further cause the processor to:
receive updated capabilities data indicating a change to the threshold number of audio objects that can be processed by a speaker configuration of an endpoint device in communication with the computing device;
generate updated allocation data indicating an updated number of allocated audio objects for the at least one application based on the updated contextual data; and
transmit updated allocation data to the at least one application for modifying the number of audio objects generated by the at least one application.

14. The computing device of claim 11, wherein the at least one application comprises a first application and a second application, wherein the allocation data indicates a first number of allocated audio objects for the first application and a second number of allocated audio objects for the second application, wherein the first number of allocated audio objects is greater than the second number of allocated audio objects when the policy data indicates that a priority value associated with the first application is higher than a priority value associated with the second application.

15. The computing device of claim 11, wherein the contextual data indicates a level of user interaction with the individual applications, wherein generating the allocation data indicating the allocation of audio objects for the at least one application is further based on the level of user interaction with the individual applications.

16. The computing device of claim 11, wherein the contextual data indicates a priority value that is based on a user interface arrangement, wherein generating the allocation data indicating the allocation of audio objects for the at least one application is further based on the priority value.

17. The computing device of claim 11, wherein the computer-executable instructions further cause the processor to:
cause the encoder to generate a rendered output signal based on the generated audio objects; and
cause a communication of the rendered output signal from the encoder to the endpoint device for producing a spatialized audio output based on the endpoint device, wherein the spatialized audio output is an audible output.

18. The computing device of claim 11, wherein the at least one application comprises a first application and a second application, wherein the allocation data indicates a first number of allocated audio objects for the first application and a second number of allocated audio objects for the second application, wherein the first number of allocated audio objects is greater than the second number of allocated audio objects when a first graphical user interface associated with the first application has a larger display area then a second graphical user interface associated with the second application.

19. The computing device of claim 11, wherein the at least one application comprises a first application and a second application, wherein the allocation data indicates a first number of allocated audio objects for the first application and a second number of allocated audio objects for the second application, wherein the first number of allocated audio objects is greater than the second number of allocated audio objects when a first graphical user interface associated with the first application is positioned within a predetermined area and a second graphical user interface associated with the second application is positioned outside of the predetermined area.

20. The computing device of claim 11, wherein the at least one application comprises a first application and a second application, wherein the allocation data indicates a first number of allocated audio objects for the first application and a second number of allocated audio objects for the second application, wherein the first number of allocated audio objects is greater than the second number of allocated audio objects when input data from an input device indicates that a user is viewing a first graphical user interface associated with the first application instead of a second graphical user interface associated with the second application.

21. A method, comprising:
receiving contextual data indicating a status with individual applications of a plurality of applications;
receiving policy data defining priorities for individual applications of a plurality of applications;
generating allocation data indicating a number of allocated audio objects for at least one application of the plurality of applications based, at least in part, on the policy data defining a priority for the at least one application, wherein the number of allocated audio objects for the at least one application does not exceed a threshold number of audio objects that can be processed by the speaker configuration of an endpoint device; and
transmitting the allocation data to the at least one application causing the at least one application to control a number of generated audio objects, wherein the number of generated audio objects does not exceed the number of allocated audio objects, wherein the at least one application causes an encoder to render the generated audio objects at the endpoint device.

22. The method of claim 21, further comprising:
receiving updated contextual data indicating a change associated with the individual applications;
generating updated allocation data indicating an updated number of allocated audio objects for the at least one application based on the updated contextual data; and
transmitting updated allocation data to the at least one application for modifying the number of audio objects generated by the at least one application.

23. The method of claim 21, further comprising:
receiving updated capabilities data indicating a change to the a threshold number of audio objects that can be processed by a speaker configuration of an endpoint device in communication with the computing device;
generating updated allocation data indicating an updated number of allocated audio objects for the at least one application based on the updated contextual data; and
transmit updated allocation data to the at least one application for modifying the number of audio objects generated by the at least one application.

24. The method of claim 21, wherein the at least one application comprises a first application and a second application, wherein the allocation data indicates a first number of allocated audio objects for the first application and a second number of allocated objects for the second application, wherein the first number of allocated audio objects is greater than the second number of allocated objects when the policy data indicates that a priority value associated with the first application is higher than a priority value associated with the second application.

25. The method of claim 21, wherein the contextual data indicates a level of user interaction with the individual applications, wherein generating the allocation data indicating the allocation of audio objects for the at least one application is further based on the level of user interaction with the individual applications.

* * * * *